United States Patent [19]

Mullane et al.

[11] Patent Number: 4,661,668
[45] Date of Patent: * Apr. 28, 1987

[54] WELDING INTERCELL CONNECTIONS BY INDUCTION HEATING

[75] Inventors: William E. Mullane, Warren, Ohio; David Lund, Minneapolis, Minn.

[73] Assignee: The Taylor-Winfield Corporation, Warren, Ohio

[*] Notice: The portion of the term of this patent subsequent to Feb. 10, 2004 has been disclaimed.

[21] Appl. No.: 782,477

[22] Filed: Oct. 1, 1985

[51] Int. Cl.$^4$ .............................................. H05B 6/10
[52] U.S. Cl. .................................. 219/10.41; 219/9.5; 219/10.57; 219/10.67; 219/85 A; 29/623.1
[58] Field of Search .................... 219/10.43, 10.41, 9.5, 219/10.73, 10.57, 10.49 R, 10.71, 10.67, 85 A; 29/623.1, 623.2, 623.4, 730, 731

[56] References Cited

U.S. PATENT DOCUMENTS

| | | | |
|---|---|---|---|
| 3,441,448 | 4/1969 | Hayward et al. | 29/623.2 |
| 3,544,754 | 12/1970 | Buttke et al. | 219/79 |
| 3,589,948 | 6/1971 | Adams | 219/85 A |
| 3,767,889 | 10/1973 | Sano et al. | 29/623.1 X |
| 4,458,125 | 7/1984 | Leis | 219/10.41 |
| 4,485,959 | 12/1984 | Orlando et al. | 29/623.1 X |
| 4,501,943 | 2/1985 | Lund | 219/10.43 |

Primary Examiner—Philip H. Leung
Attorney, Agent, or Firm—William J. Ruano

[57] ABSTRACT

In a storage battery having a plurality of electrically insulating vertical partitions, the method of the invention comprises sandwiching each partition, successively, between a pair of terminals of lead or other easily fusible material of the so-called "tombstone" type, that is, of "L" shape in which the vertical or riser portion of one terminal has a horizontal pin which extends through a hole in the partition and through a hole in the riser portion of the other terminal. An insulating sheet and induction coil are placed against the end of the pin by a fusing apparatus which is provided with a pair of arms which are pivotally operated by a fluid cylinder, one arm carrying the above-mentioned coil and insulating sheet and the other acting as a pusher. The terminal pairs and partition are squeezed together by said arms and thereafter induction current is applied to the coil to fuse the perimetrical portion of the pin and surrounding surface of the hole of the other terminal so as to fill the void therebetween and form a solid intercell connection.

11 Claims, 3 Drawing Figures

WELDING INTERCELL CONNECTIONS BY INDUCTION HEATING

This invention relates to an apparatus and method for intercell fusion of lead/acid storage batteries and, more particularly, to "through-the-partition" type intercell construction, with "pin and ring" style lead intercell connectors.

BACKGROUND OF THE INVENTION

1. Prior Art

In one method, known as "over-the-partition hand burning" (riser construction), vertical lead risers from cell elements which sandwich an intervening rubber or plastic partition are melted over the partition and fused manually, using a gas torch. A metal or ceramic mold is used to contain the molten lead. The fused, cooled lead forms the intercell connection.

In another method, known as "through-the-partition hand burning", (pin and ring construction), a lead pin extends horizontally from the lead tombstone of the positive strap of one cell element, through a round orifice in the intervening rubber or plastic partition, and into a horizontal round orifice (ring) in the lead tombstone of the negative strap of the element in the adjacent cell. The positive pin and negative ring are melted and fused manually, using a gas torch. A metal or ceramic mold is used to contain the molten lead. The fused, cooled lead forms the intercell connection.

In still another method, known as "intercell resistance welding" (flat tombstone construction), vertical flat lead tombstones from the straps of elements in adjacent cells are positioned over a round orifice in the intervening rubber or plastic partition. Electrodes deform the tombstones until they make contact within the orifice in the partition. Current is then applied across the two tombstones; internal and contact resistance creates heat to melt and fuse the tombstones within the orifice in the partition. The fused, cooled lead forms the intercell connection.

In still another method, known as "over-the-partition induction heated intercell fusion" (riser construction), vertical lead risers from cell elements adjacent to an intervening rubber or plastic partition are melted and fused using induction heat. A mold is used to contain the molted lead. The fused, cooled lead forms the intercell connection.

2. Outstanding Disadvantages of the Prior Art

Over-the-partition hand burning, and through-the-partition hand burning, are manual operations, thus they are relatively slow and yield intercell connections of inconsistent and unreliable quality.

Intercell resistance welding has been automated and is relatively fast, but it produces intercell connections of inconsistent and unreliable quality.

Over-the-partition hand burning and over-the-partition induction heated intercell fusion, share the disadvantage of the epoxy-sealed covering method used. This covering process has proven difficult to control and auotomate.

3. Preceding Patents Noted

The subject process, through-the-partition pin and ring induction heated intercell fusion differs markedly from previously patented processes as described below.

U.S. Pat. No. 3,544,754, granted Dec. 1, 1970, to Buttke et al. and related patents refer to a method and apparatus for fusing lead/acid battery intercell terminals using "extrusion fusion" and resistance welding. Vital to this proces is the principle of extruding lead through an orifice in the battery container partition. Since, in the process of the present invention detailed here, no external pressure is supplied to extrude the lead, and since induction heating (not resistance welding) is utilized, U.S. Pat. No. 3,544,754 does not apply.

U.S. Pat. No. 3,589,948, granted June 29, 1971 to Adams refers to various techniques, including induction heating, used to fuse intercell connections (with flat tombstones) through an orifice in battery container partitions. This patent specifies the use of a "mold" to "contain" the molten lead. Since the process of the present invention detailed here uses lead intercell terminals molded into male and female configuration (not flat), and since molds are not used to contain the molten lead, U.S. Pat. No. 3,589,948 does not apply.

U.S. Pat. No. 4,501,943, granted Feb. 1985, to Lund, and U.S. Pat. No. 4,523,068, granted June 11, 1985 to Lund, et al., refer to a method and apparatus for fusing external battery top terminal posts. These patents specify the use of a "concentric mold" to contain the molten lead. Since the process of the present invention detailed here refers to fusion of intercell connectors inside the battery, not external top terminal posts, and because molds are not used to contain the molten lead, U.S. Pat. Nos. 4,501,943 and 4,523,068 do not apply.

U.S. Pat. No. 3,336,164, granted Aug. 15, 1967 to Miller, and related patents, refer to method and apparatus for fusing internal intercell connections with pin and ring construction using manual gas torch "burning". Since the present invention detailed here, through-the-partition pin and ring induction heated intercell fusion, employs induction heating (not manual gas torch "burning"), U.S. Pat. No. 3,336,164 does not apply.

SUMMARY OF THE INVENTION

An object of the invention is to overcome the above-named disadvantages by providing induction heat to be used to produce intercell connections of uniformly high quality in lead/acid storage batteries with "through-the-partition" type construction using "pin and ring" lead intercell connectors.

Another object of the present invention is to automatically, rapidly and reliably fuse the series electrical connections between adjacent cell elements in a lead/acid storage battery, constructed with "pin and ring" "through-the-partition" type intercell connections to achieve high production rates of 3 to 4 batteries per minute—or, in smaller semi-automatic devices 1 to 2 batteries per minute.

BRIEF DESCRIPTION OF THE DRAWINGS

Other objects and advantages will become apparent from a study of the following description taken with the accompanying drawings wherein.

DESCRIPTION OF THE PREFERRED EMBODIMENT

Figure 1:
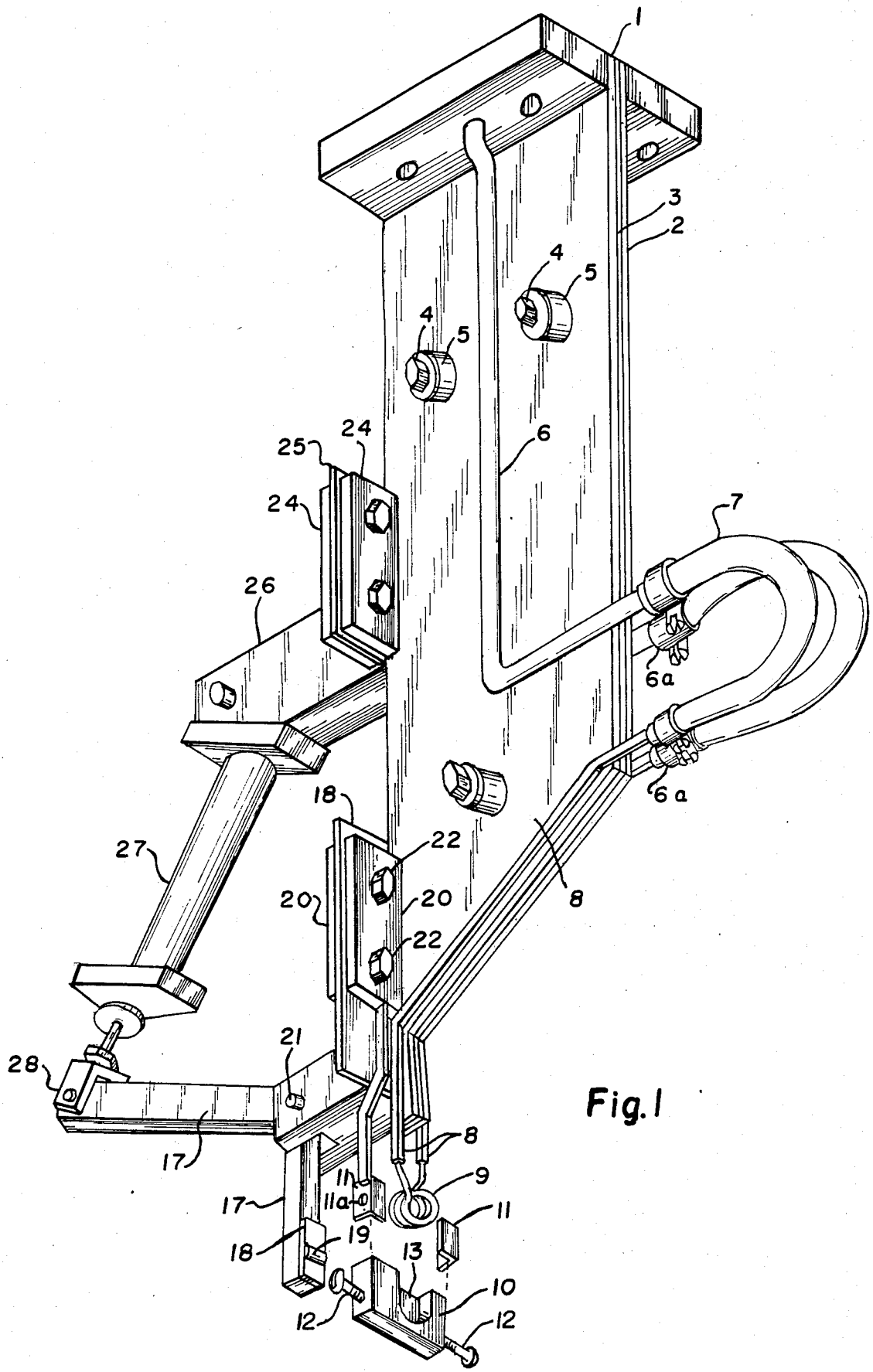
FIG. 1 is a perspective view of a fusion apparatus for use in the present invention.

Referring more particularly to FIG. 1, it shows a fusion device comprising flat terminals 1 and 2 of copper or other suitable electrical conducting material, having sandwiched therebetween an electrical insulator 3. This assembly is clamped together by a plurality of bolts 4, electrically insulated from the terminals by insulator rings 5. Metal tubes 6, one on each side of the fusion device, which are of copper or other electrical conducting material, are connected at their lower ends, by clamps 6a or hoses 7,7 which are, in turn, connected to electrical conducting tubes 8,8 whose lower terminals are integrally connected to the ends of a tubular induction coil 9 of electrical conducting material, such as copper. The coil 9 preferably has two or more turns which are fitted into a correspondingly shaped opening in refractory insulator 10, shown in an exploded view for clarity of illustration.

In assembly, the sides of insulator 10 are slid into flanged supports 11,11 and bolts 12,12 are inserted through holes 11a and thereafter tightened so that coil 9 will be supported directly opposite a metal plate 18 having a bulged portion 19, both of which are supported opposite the lower end of a lever 17,17 pivotally mounted on the pivot 18. A mica strip 13 is provided on one side of insulator 10.

Flange 20,20 has an insulator 21 therebetween which is bolted by means of bolts 22 to the pivot block 21. Likewise, flanges 24,24 are separated by insulator 25 for insulating the supporting arm 26 to which one end of a fluid cylinder 27 is connected. The other end of this cylinder is connected pivotally by a pin 28 to lever 17,17.

In operation, in response to the well-known sliding operation of the piston (not shown) in cylinder 27, by selective introduction of a suitable fluid, such as air or liquid, or either one side or an opposite side of the piston, the lever 17,17 can move either counterclockwise or clockwise so as to selectively push the plate 18 and bulge 19 either towards or away from coil 9.

It will be understood that a suitable liquid, such as water, will flow through the tubular conduits 6, 7, 8 and 9 to cool coil 9.

Such coil 9 is energized by high frequency alternating current to provide induction heating to any inductive object(s) between it and the plate 18.

The device shown in FIG. 1 may be used to fuse intercell connections such as described hereinafter.

Figure 2:
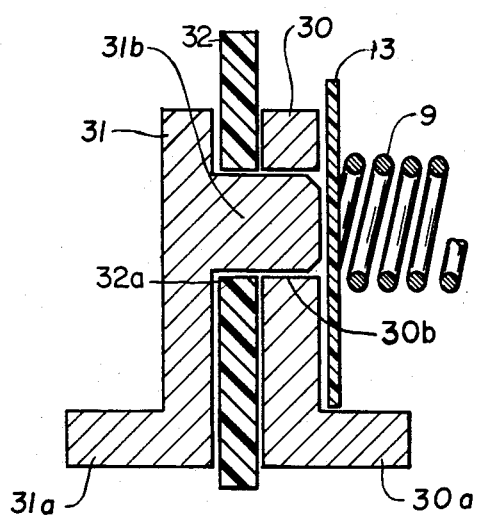
FIG. 2 is a vertical cross sectional view of pin and ring arrangement for induction heating according to the present invention.
Figure 3:
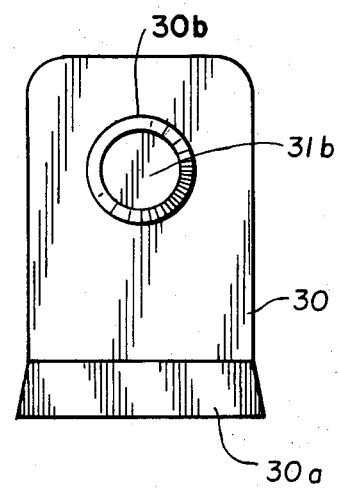
FIG. 3 is a side view thereof.

FIG. 2 and FIG 3 show a pair of tombstones 30,31 having straps 30a and 31a, respectively, which are of lead or other suitable material, which can be melted under relatively low heat. Partition 32, of polypropylene or other suitable electrically insulating material, is provided with a hole 32a through which extends the male portion (pin) 31b of tombstone 31. Said male pin 31b also extends through the female ring 30b in the adjacent tombstone 30.

More specifically, an induction coil 9, such as shown in FIG. 1, may be applied alongside one of the tombstones, such as 30, preferably concentric with the pin 31b and ring 30b, so as to provide a heat zone at the external surface portions of the pin 31b and ring 30b. The device shown in FIG. 1 may be applied so as to tightly hold together tombstones 30,31 and apply induction heat through coil 9. This will avoid the necessity of using a surrounding mold since the unmelted sides of the tombstones 30,31 and mica strip 13 dam the molten lead.

In operation, after the A.C. induction current, of the order of 450 KHZ (K-hertz), or other value, is applied to coil turns 9, and at the same time as the tombstones and mica strip 13 are being squeezed by two arms of the welder, then, upon application of induction A.C. current, lead of the tombstones will melt in the vicinity of the external surface portions of the pin 31b and ring 30b. After fusing and cooling, this melt of pin 31b and ring 30b forms a rugged, high quality intercell connection.

Thus it will be seen that we have provided an efficient, rapid, quick and consistently reliable method and apparatus for joining together pin and ring style lead intercell connectors by "through-the partition" interconnection which lends itself to mass production methods.

While we have illustrated and described a single specific embodiment of our invention, it will be understood that this is by way of illustration only and that various changes and modifications may be contemplated in our invention within the scope of the following claims.

We claim:

1. In a storage battery having a plurality of parts of terminals of readily fusible material, each pair of terminals sandwiching an electrical insulating vertical partition having a horizontal hole therethrough, each terminal having a horizontal strap portion extending away from said partition and an integral vertical riser portion, one of said riser portions of each pair of terminals having an integral horizontal pin portion extending through said horizontal hole of said partition and through a registering hole in the other riser portion; the method of making an intercell connection between each pair of terminals comprising applying a vertical insulating sheet against the outside of the terminal having the horizontal hole and applying an electrical induction coil adjacent the outside of said sheet substantially concentric with said pin, squeezing together said sheet, pair of terminals and partition, and applying high frequency electrical current to said coil sufficiently as to partially fuse said pin and surrounding perimetrical portion of said horizontal hole of said terminal, using said sheet and vertical riser portion of the pin bearing terminal as dams to contain the fused metal, and thereafter allowing said fused metal to cool and solidify.

2. The method recited in claim 1 wherein said method is performed successively on each pair of said plurality of pairs of terminals.

3. The method recited in claim 1 wherein said vertical insulating sheet is carried by said one arm.

4. In a storage battery having a plurality of pairs of terminals of readily fusible material, each pair of terminals sandwiching an electrical insulating vertical partition having a horizontal hole therethrough, each terminal having a horizontal strap portion extending away from said partition and an integral vertical riser portion, one of said riser portions of each pair of terminals having an integral horizontal pin portion extending through said horizontal hole of said partition and through a registering hole in the other riser portion, the combination of said terminals and vertical partitions with a fusing apparatus for making an intercell connection between a pair of said terminals and the associated vertical partition, said fusing apparatus comprising a first arm terminating in a refractory insulator block carrying an electrically insulating sheet engagable with the end of said pin portion and the side of said other of said riser portions to serve as a dam for retaining fused metal, a coil energizable by high frequency electrical current and which is devoid of electrical connection with said pair of terminals, a pivotally connected second arm actuated by fluid-operated means to confront said first arm and squeeze together said pair of terminals against said associated vertical partition with said coil substantially concentric with said horizontal pin partition so as to fuse said horizontal pin portion by induction heat from said coil to form an intercell connection.

5. The combination recited in claim 4 wherein said terminals are of lead.

6. The combination recited in claim 4 wherein said frequency is of the order of 450 KHZ.

7. The combination recited in claim 4 wherein said sheet is of mica.

8. The combination recited in claim 4 wherein said partition is of polypropylene.

9. The combination recited in claim 4 wherein said fluid-operated means comprises a hydraulic cylinder.

10. The combination recited in claim 4 wherein said refractory insulator block is also provided with a vertical insulating sheet of electrically insulating material to serve as a dam to hold the fused horizontal pin portion.

11. The combination recited in claim 4 wherein said second arm carries a rounded portion which engages the outer surface of the pin portion carrying terminal.

* * * * *